US011322317B2

(12) United States Patent
Figueras

(10) Patent No.: US 11,322,317 B2
(45) Date of Patent: May 3, 2022

(54) ELECTRICAL SWITCH BOX WITH BOLT HOUSING

(71) Applicant: Sumitomo Wiring Systems, Ltd., Yokkaichi (JP)

(72) Inventor: Nicholas Figueras, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 58 days.

(21) Appl. No.: 17/038,317

(22) Filed: Sep. 30, 2020

(65) Prior Publication Data

US 2022/0102086 A1 Mar. 31, 2022

(51) Int. Cl.
*B60R 16/023* (2006.01)
*H01H 9/02* (2006.01)

(52) U.S. Cl.
CPC ............ *H01H 9/0271* (2013.01); *H01H 9/02* (2013.01)

(58) Field of Classification Search
CPC ........................... H01H 9/0271; H01H 50/021
See application file for complete search history.

(56) References Cited

U.S. PATENT DOCUMENTS

| | | | | |
|---|---|---|---|---|
| 10,601,154 B2 * | 3/2020 | Shiomi | H02G 3/081 |
| 2008/0094783 A1 * | 4/2008 | Lin | H02M 7/003 361/622 |
| 2018/0191232 A1 * | 7/2018 | Zou | H02K 1/14 |

* cited by examiner

*Primary Examiner* — Jared Fureman
*Assistant Examiner* — Esayas G Yeshaw
(74) *Attorney, Agent, or Firm* — Honigman LLP

(57) ABSTRACT

A housing for accommodating an electrical device is provided. A bolt for holding a bus bar electrically connected to the electrical device includes a threaded shaft and a base. The housing includes a first housing configured to hold the electrical device and a bolt housing. The bolt housing includes an upper wall having a U-shaped slot. A resilient tab is disposed on a bottom wall and beneath the U-shaped slot. A pair of slits are disposed on each side of the resilient tab, wherein the threaded shaft is dimensioned to be seated within the U-shaped slot, and wherein the resilient tab presses the base against an undersurface of the upper wall so as to hold the bolt in an upright position relative to the upper wall.

12 Claims, 9 Drawing Sheets

ELECTRICAL SWITCH BOX WITH BOLT HOUSING

TECHNICAL FIELD

The present specification generally relates to a switch box having a bolt housing configured to retain the bolt in a rigid position.

BACKGROUND

A housing for accommodating an electrical device is known. Such housings may include a first housing configured to hold an electrical device such as an electrical switch and a bolt housing configured to hold a bolt. The switch is coupled to a bus bar and the bus bar is mounted to the bolt wherein an eyelet terminal is laid on top of the bus bar to complete an electric connection to an external device.

Currently, the bolt housing includes a slot configured to receive a base of the bolt and a pair of nubs are formed on opposite sides of the slot so as to retain the bolt in place. A depiction of a conventional bolt housing 500 is provided in FIG. 8. In particular the nubs 505 are configured to engage the sides of the base of the bolt (not shown). Such an accommodation is suitable when the bolt is maintained in a generally upright manner, that is, when the shaft of the bolt extends along a vertical plane. However, in some instances it is desirable to have the housing mounted onto a component which places the shaft of the bolt along a horizontal plane. In such an instance the bolt may tilt thus making installation of a terminal connector difficult.

Accordingly, it is desirable to have a housing wherein the bolt housing is configured to retain the bolt in a rigid manner so as to allow for an orientation of the housing along multiple planes, e.g. any plane between the vertical and horizontal plane.

SUMMARY

A housing for accommodating an electrical device is provided. The housing includes a bolt for holding a bus bar. The bus bar is electrically connected to the electrical device. The bolt includes a threaded shaft and a base.

The housing includes a first housing configured to hold the electrical device and a bolt housing configured to hold the bolt. The bolt housing includes an upper wall, a pair of side walls and a bottom wall that are interconnected so as to define a space for receiving the base of the bolt. The upper wall includes a U-shaped slot so as to receive the shaft of the bolt.

A resilient tab is disposed on the bottom wall of the bolt housing and beneath the U-shaped slot. A pair of slits are disposed on the bottom wall and on each side of the resilient tab. The threaded shaft of the bolt is dimensioned to be seated within the U-shaped slot and the base is seated between the top wall and the resilient tab, wherein the resilient tab is configured to press the base against the undersurface of the upper wall so as to hold the bolt in an upright manner relative to the upper wall. Accordingly, the housing may be mounted in in such a manner as to place the shaft along a horizontal plane without the shaft of the bolt tilting.

In one aspect the resilient tab includes a catch disposed on a distal end of the resilient tab. The catch may include a head portion having a front surface. The front surface is angled with respect to a planar surface of the resilient tab.

The catch may further include a catch surface. The catch surface is a planar surface orthogonal to a body of the resilient tab. The catch may further include a pair of side surfaces. Each of the side surfaces are angled. The side surfaces and the front surface define a tapered body.

In another aspect of the catch, the pair of side surfaces are planar with respect to the outer side walls of the resilient tab. The catch surface extends between opposing sides of the resilient tab so as to define a distal end which is planar. The distal end extends between the outer side walls of the resilient tab.

A switch box for accommodating an electrical switch is also provided. The switch box includes a bolt for holding a bus bar. The bus bar is electrically connected to the electrical switch. The bolt includes a threaded shaft and a base.

The switch box includes a first housing. The first housing is configured to hold the electrical switch. The first housing includes a pair of peripheral walls, a front wall and a back wall.

The switch box further includes a bolt housing. The bolt housing is disposed on the front wall of the first housing. The bolt housing includes an upper wall, a pair of side walls and a bottom wall. The upper wall, side walls and bottom wall are interconnected so as to define a space for receiving the base of the bolt. The upper wall includes a U-shaped slot and the bottom wall is disposed on the front wall of the first housing.

The switch box further includes a resilient tab. The resilient tab is disposed on the bottom wall of the bolt housing and beneath the U-shaped slot. The resilient tab is also disposed above the front wall of the housing.

A pair of slits are disposed on the bottom wall so as to be on each side of the resilient tab. The threaded shaft of the bolt is dimensioned to be seated within the U-shaped slot and the base of the bolt is dispose between the resilient tab and the upper wall, wherein the resilient tab presses the base against an undersurface of the upper wall so as to hold the bolt in an upright manner relative to the upper wall.

In one aspect the switch box includes a resilient tab having a catch disposed on the distal end of the resilient tab. The catch includes a front surface. The front surface is angled with respect to a planar surface of the resilient tab.

The catch may further include a catch surface. The catch surface is a planar surface orthogonal to a body of the resilient tab. The catch may further include a pair of side surfaces. Each of the side surfaces are angled. The side surfaces and the front surface define a tapered body.

In another aspect of the catch, the pair of side surfaces are planar with respect to the outer side walls of the resilient tab. The catch surface extends between opposing sides of the resilient tab so as to define a distal end which is planar. The distal end extends between the inner side walls of the resilient tab.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Referring generally to the figures, embodiments of a housing for accommodating an electric device is provided. The housing is configured to retain a bolt in an upright and rigid position by pressing the base of the bolt against a wall. In particular, the housing includes a bolt housing that is configured to urge the base of the bolt against an upper wall of the bolt housing so as to retain the bolt in a upright position relative to the upper wall. Accordingly, the bolt may remain in a fixed position even when the bolt is positioned in a plane offset from a vertical plane.

In one aspect, the housing is configured to accommodate an electrical device such as a switch. The housing includes a bolt for holding a bus bar. The bus bar is electrically connected to the electrical device. The bolt includes a threaded shaft and a base.

The housing includes a first housing configured to hold the electrical device and a bolt housing. The bolt housing includes an upper wall, a pair of side walls and a bottom wall. The upper wall includes a U-shaped slot and a resilient tab is disposed on the bottom wall.

The resilient tab is also positioned beneath the U-shaped slot. A pair of slits are disposed on the bottom wall and on each side of the resilient tab so as to allow the resilient tab to flex. The shaft of the bolt is seated within the U-shaped slot and the resilient tab is configured to press the base against an under surface of the upper wall so as to hold the bolt in an upright position relative to the upper wall even when the bolt is positioned along a horizontal plane.

Figure 1:
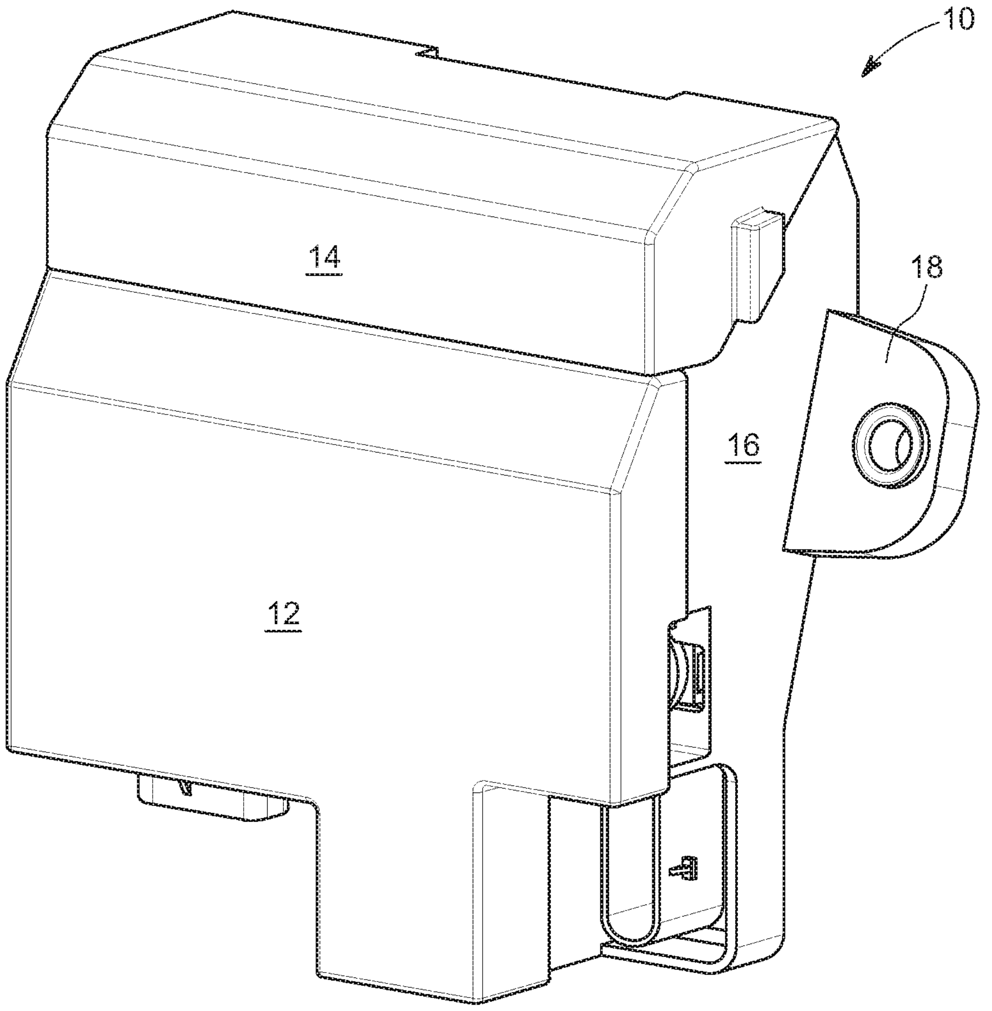
FIG. 1 is a perspective view of a housing.

With reference first to FIG. 1, an illustrative depiction of a housing 10 is provided. The housing 10 is configured to hold an electrical device 100 (shown in FIGS. 2-6) and a bus bar 102 (shown in FIGS. 2-6). The bus bar 102 is electrically coupled to the electrical device 100 and a bolt 104 is configured to hold the bus bar 102 in place.

The housing 10 includes a top cover 12, a stud cover 14 and a bottom cover 16. The housing 10 includes an attachment structure 18 for attaching the housing 10 to a substrate (not shown). The top cover 12 and the stud cover 14 may be configured to snap onto the bottom cover 16 using mechanical fastening means currently known or later developed.

The top cover 12, the stud cover 14, the bottom cover 16 and the attachment structure 18 may be made of a material suitable for an injection molding process. The attachment structure 18 may be integrally molded with bottom cover 16. The attachment structure 18 includes a bore which accommodates a bolt (not shown) for attaching the housing 10 to the substrate.

Figure 2:
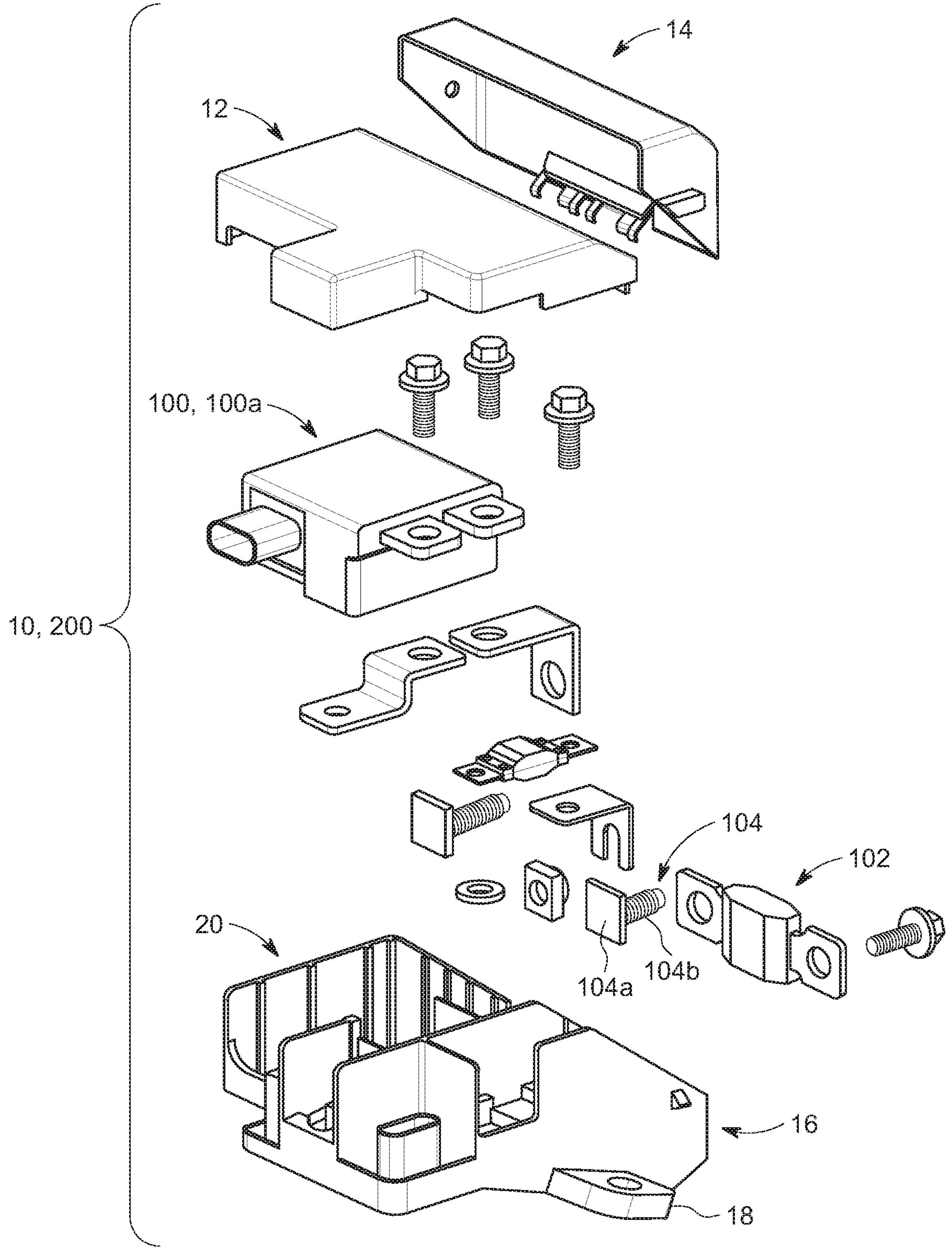
FIG. 2 is an exploded view of the housing shown in FIG. 1.

With reference now to FIG. 2, an exploded view of the housing 10 is provided. For illustrative purposes, the electrical device 100 is shown as an electrical switch 100*a*. The housing 10 holds various fuses and bus bars (102, 106) through which power is inputted and outputted by the electrical switch 100*a*.

For illustrative purposes the housing 10 is described in the context of a switch box 200 configured to hold the electrical switch 100*a*. The electrical switch 100*a* is configured to direct power from a power source (not shown). The bottom cover 16 is shown in a position in which the housing 10 is to be installed. Thus, the bolt 104 is positioned such that the axial length of the threaded shaft is on a horizontal axis.

With reference now to FIGS. 3 through 5*b*, a description of the housing 10 is provided. The housing 10 includes a first housing 20 configured to hold the electrical device 100 and a bolt housing 22. The first housing 20 and the bolt housing 22 may be formed as an integral part of the bottom cover 16.

The bolt housing 22 includes an upper wall 24, a pair of side walls 26 and a bottom wall 28. The upper wall 24 includes a U-shaped slot 30. The upper wall 24, the side walls 26 and the bottom wall 28 are generally planar members and are connected to each other so as to define a space for receiving a base 104*a* of the bolt 104. In particular, the upper wall 24 is spaced apart from and elevated with respect to the bottom wall 28. The side walls 26 extend between the peripheral edges of the upper wall 24 and the bottom wall 28, so as to define a front opening 32. The height of the front opening 32 is defined by a height of the side walls 26 and is taller than a height of the base 104*a*.

The housing 10 further includes a resilient tab 34. The resilient tab 34 is a flexible member configured to return to a natural state. The resilient tab 34 is disposed on the bottom wall 28 of the bolt housing 22 and is beneath the U-shaped slot 30. A pair of slits 36 are disposed on the bottom wall 28 and are on each side of the resilient tab 34.

The threaded shaft 104*b* of the bolt 104 is dimensioned to be seated within the U-shaped slot 30. The base 104*a* of the bolt 104 is inserted into the front opening 32 of the bolt housing 22 so as to be seated between the resilient tab 34 and an under surface of the upper wall 24, wherein the resilient tab 34 presses the base against the under surface of the upper wall 24 so as to hold the bolt 104 in an upright position relative to the upper wall. It should be appreciated that the load placed upon the base by the resilient tab 34 helps maintain the threaded shaft 104*b* in a fixed position. Thus when the housing 10 is mounted such that the threaded shaft 104*b* is on a horizontal plane, the threaded shaft does not tilt.

Figure 3:
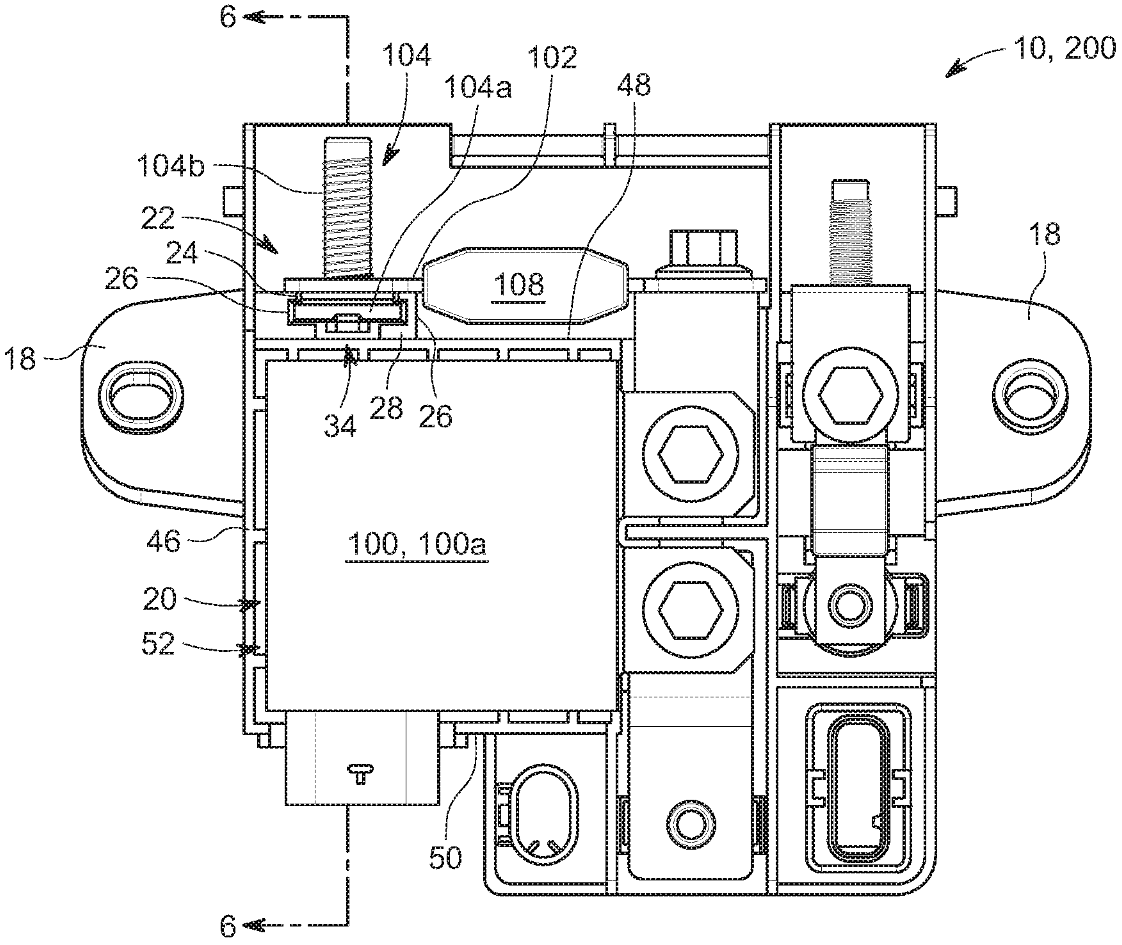
FIG. 3 is a top down view of the housing showing the top cover and the stud cover removed.

With reference specifically now to FIG. 3, a top down view showing the resilient tab 34 pressing the base 104*a* up against an under surface of the upper wall 24 is provided. FIG. 3 also provides an assembled view of the various electric components shown in FIG. 2, to include additional bus bars, fuses, bolts and the like. It should be appreciated that although the housing 10 is shown as having only one bolt housing 22, additional bolt housings 22 may be incorporated herein without deviating from the scope of the appended claims.

Figure 4:
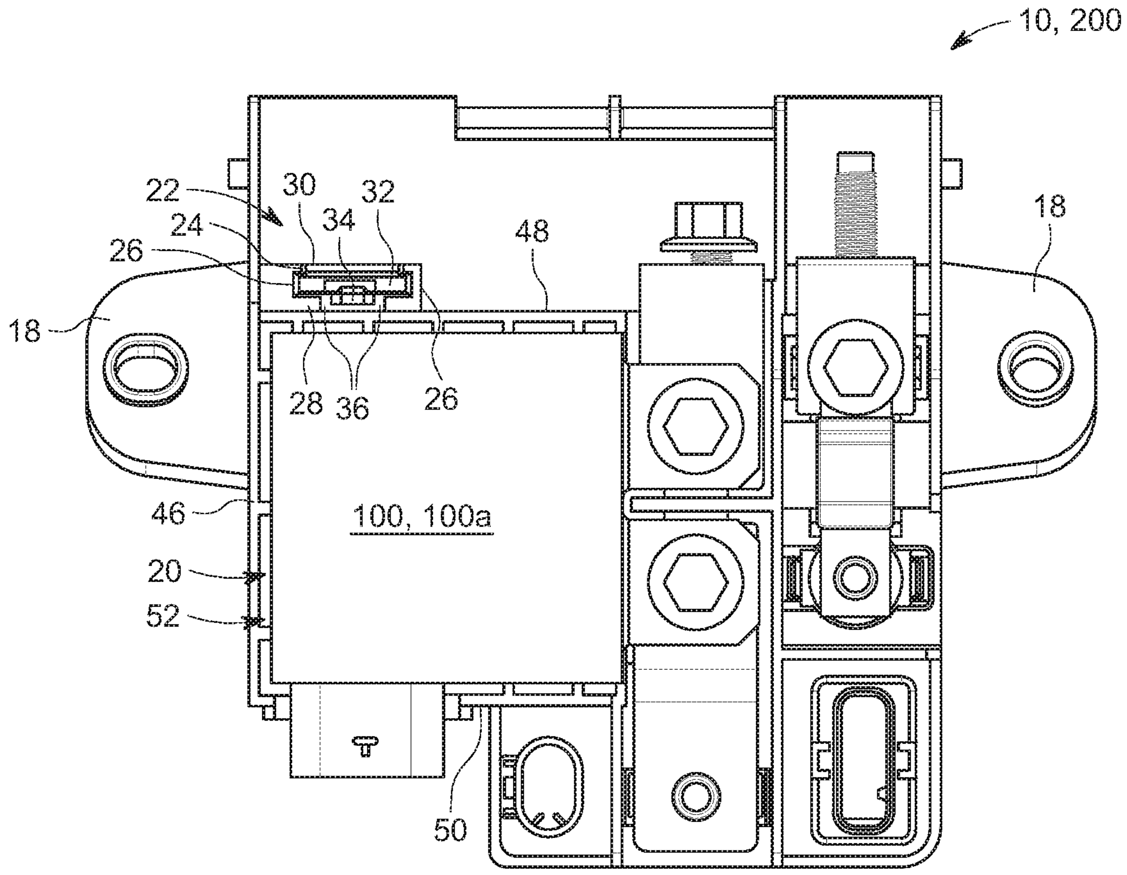
FIG. 4 is a view of FIG. 3 with the bolt and the bus bar removed.

FIG. 4 shows the bolt housing 22 without the bolt 104 and the bus bar 102. The side walls 26, the upper wall 24 and the bottom wall 28 are spaced apart from each other so as to form a generally cuboidal shaped slot which defines the front opening 32. The base 104*a* of the bolt 104 is simply slid into the front opening 32 wherein the resilient tab 34 is urged downwardly until the base 104*a* passes a catch 38 of the resilient tab 34. Once the base 104*a* passes the catch 38, the resilient tab 34 returns to its natural position wherein the base 104*a* is pinched between the resilient tab 34 and the under surface of the upper wall 24. Accordingly, the base 104*a* is urged against the under surface of the top wall by the resilient tab 34.

Figure 5A:
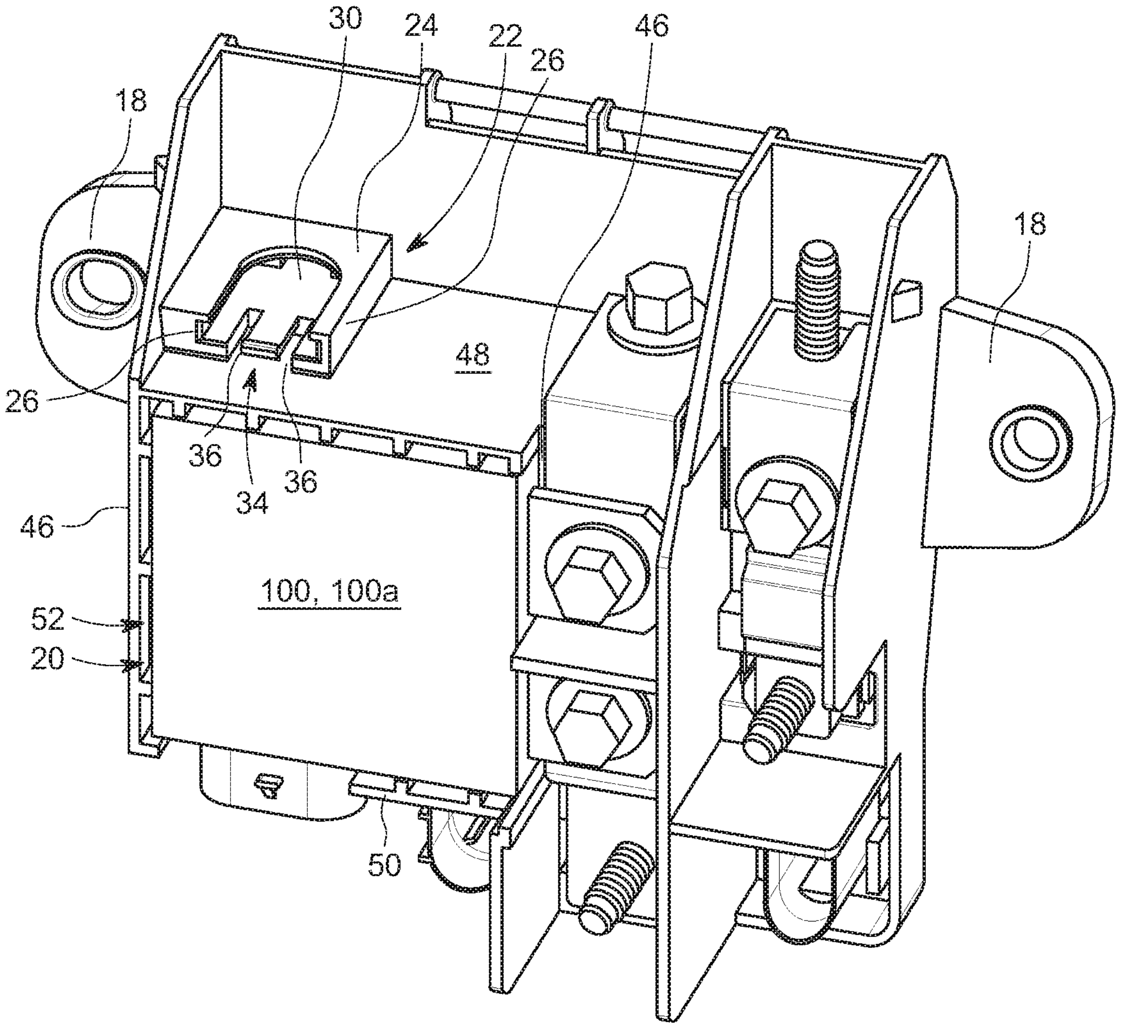
FIG. 5*a* is a perspective top down view of the first housing shown in FIG. 4.
Figure 5B:
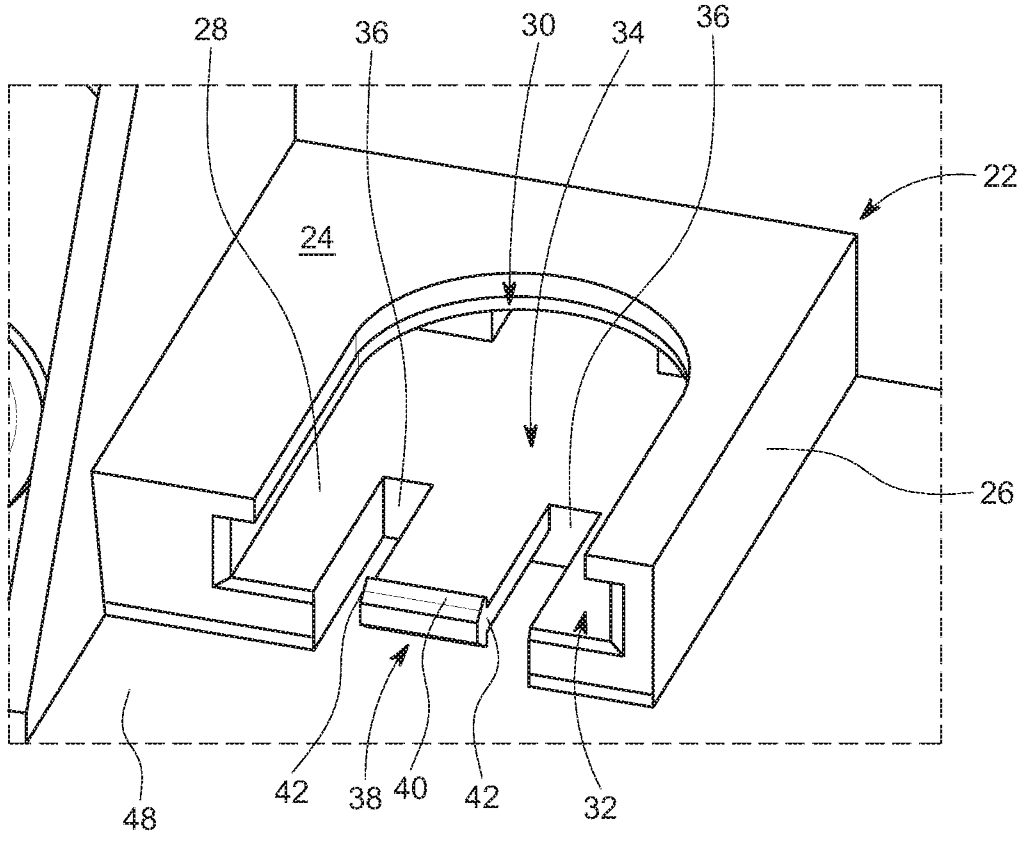
FIG. 5*b* is a close up view of the bolt housing shown in FIG. 5*a*.

With reference now to FIGS. 5*a* and 5*b*, a first aspect of the resilient tab 34 will be described. The catch 38 is disposed on a distal end of the resilient tab 34. The catch 38 includes a front surface 40. As shown, the front surface 40 is a generally planar surface that is angled with respect to a planar surface of the resilient tab 34.

In one aspect of the bolt housing 22, the catch 38 includes a pair of side surfaces 42. The side surfaces 42 are on opposite sides of the front surface 40. Each of the side surfaces are angled inwardly from a proximal end to a distal end so as to define a tapered body. The tapered body facilitates directing the load, generated when the resilient tab is flexed, toward the center mass of the resilient tab 34 so as to help prevent the resilient tab 34 from breaking.

Figure 6:
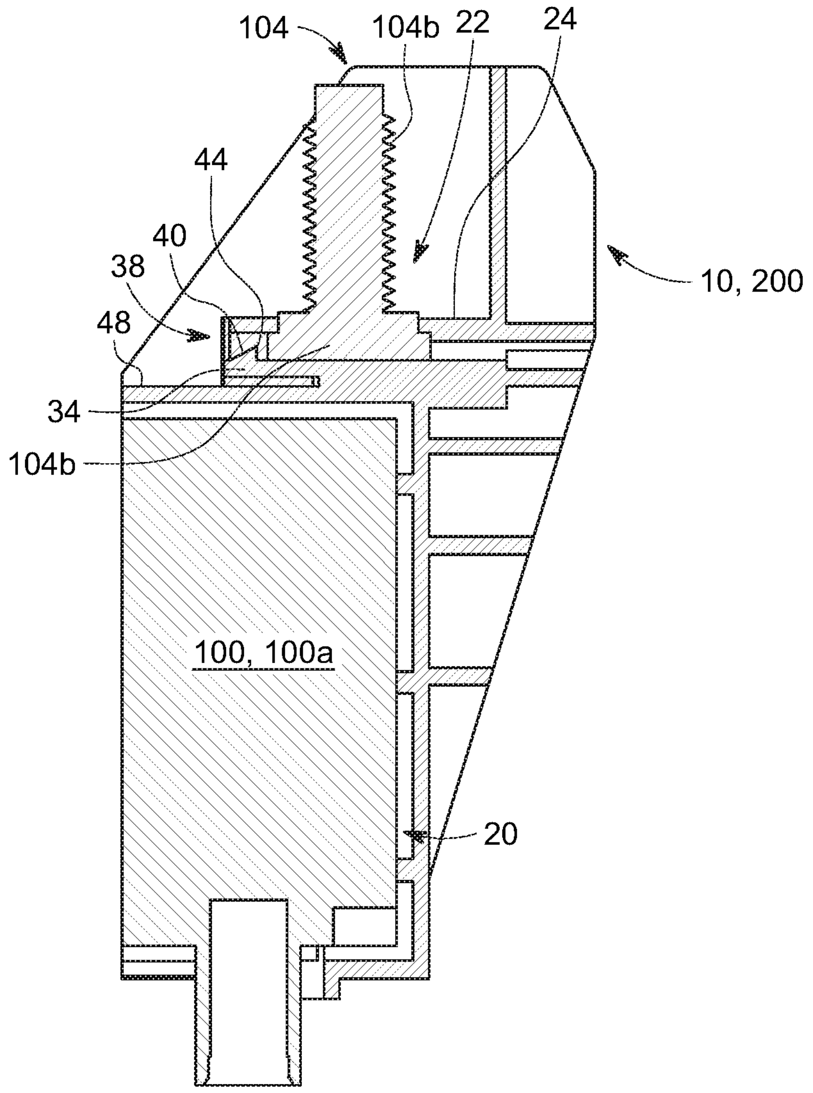
FIG. 6 is a cross-sectional view of FIG. 5 taken along line 6-6.

With reference now to FIG. 6, a cross-sectional view of FIG. 3 taken along lines 6-6 is provided. FIG. 6 shows the catch 38 having a catch surface 44. The catch surface 44 is disposed on a proximal end of the catch 38. The catch surface 44 is a planar surface which is generally orthogonal to a body of the resilient tab 34.

The catch surface 44 is configured to prevent the bolt 104 from sliding out of the bolt housing 22. In particular, the catch surface 44 is configured to contact a front wall of the base 104*a* of the bolt 104 so as to prevent the bolt 104 from being dislodge. Concurrently, a top surface of the resilient tab 34 is in contact with a bottom surface of the base 104*a* of the bolt 104 so as to urge a top surface of the base 104*a* against an under surface of the upper wall 24 of the bolt housing 22 fixing the bolt 104 with respect to the bolt housing 22. Accordingly, should the bolt 104 be positioned in a manner where the threaded shaft 104*b* extends along a horizontal plane, the threaded shaft 104*b* does not tilt.

Figure 7:
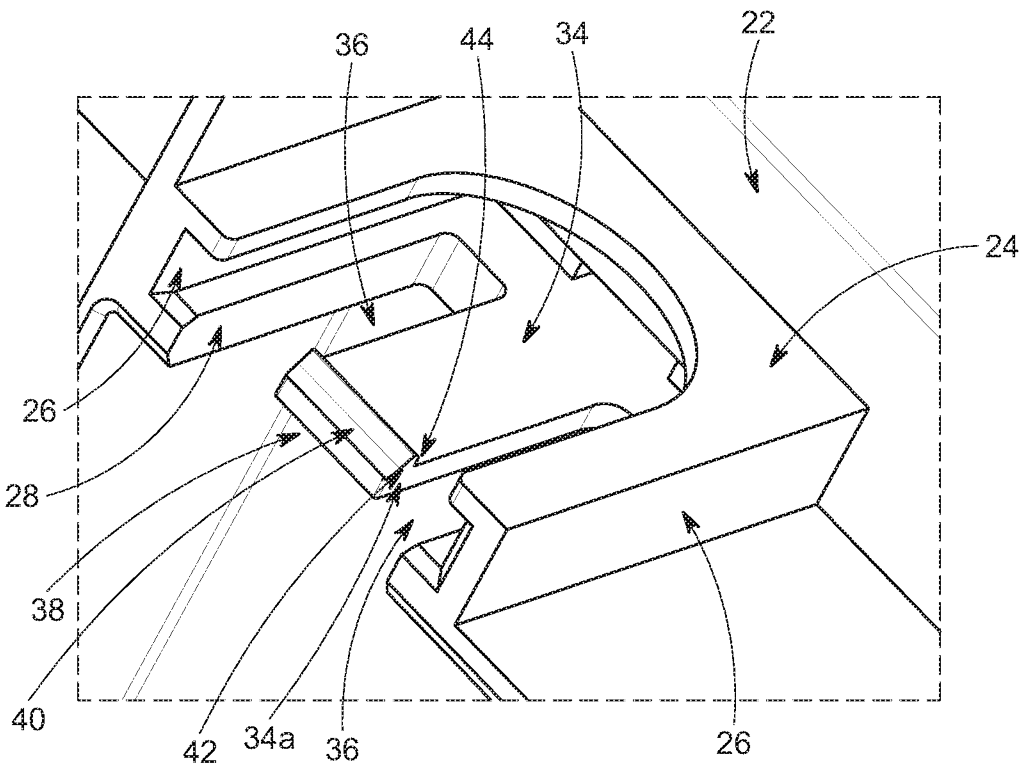
FIG. 7 is a close-up view of a bolt housing in accordance with a second embodiment.
Figure 8:
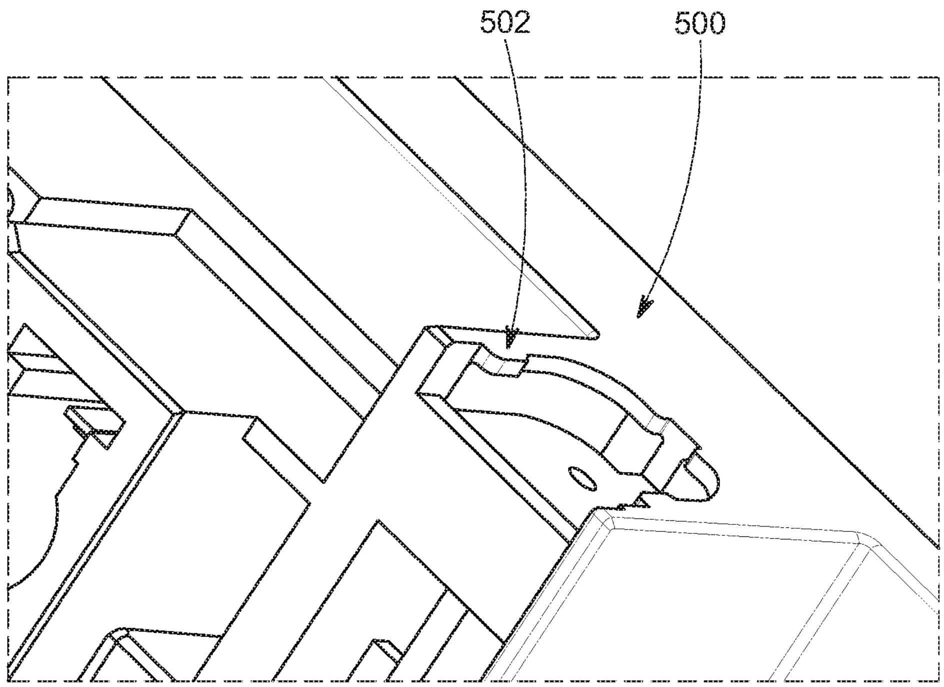
FIG. 8 is a prior art view of a bolt housing.

With reference now to FIG. 7, a second aspect of the catch 38 is provided. The pair of side surfaces 42 of the catch 38 are planar surfaces and disposed on opposite sides of the front surface 40. The side surfaces 42 are generally co-planar and contiguous with a respective pair of outer side walls 34*a* of the resilient tab 34. Accordingly, the catch 38 is generally uniform in dimension with respect to its cross-section along the width of the resilient tab 34 having a generally triangular shape. The front of the resilient tab 34 is thus a planar surface extending between the outer side walls 34*a* of the resilient tab. It should be appreciated that housing 10 may include one or more bolt housings 22 and each of the bolt housings may include the resilient tab 34 in accordance with either the first aspect or second aspect of the catch 38.

As described above, the housing 10 may be a switch box 200 for accommodating an electrical switch 100*a*. The electrical switch 100*a* is electrically connected to a power source (not shown) by a power source bus bar 106 by application of an eyelet terminal (not shown). The electrical switch 100*a* is also electrically connected to the bus bar 102 so as to provides an output signal to an external electric device (not shown) through the bus bar 102.

The bus bar 102 has a bore which is positioned over the threaded shaft 104*b* so as to secure the bus bar 102. An eyelet terminal (not shown) is laid on top of the bus bar 102 and a nut is screwed onto the eyelet terminal so as to electrically connect the electrical switch to the external electric device. The bus bar 102 is illustratively shown as having a fuse 108 for providing overcurrent protection to the external electrical device.

The first housing 20 is configured to hold the electrical switch 100*a*. The first housing 20 is illustratively shown as defining a generally cuboidal space. H With reference again to FIG. 3, the bolt 104 is shown in a generally upright manner with respect to the reference of the illustration. However, it should be appreciated that when mounted onto a substrate such as a compartment of a motor vehicle, for instance the floor underneath the front passenger seat of a vehicle, the bolt 104 is placed in a horizontal position and thus may tilt as a result of the cantilever load of the threaded shaft 104*b*.

The resilient tab 34 is a flexible member configured to return to a natural state. The resilient tab 34 is disposed on the bottom wall 28 of the bolt housing 22 and is beneath the U-shaped slot 30. A pair of slits 36 are disposed on the bottom wall 28 and are on each side of the resilient tab 34. Further, the resilient tab 34 is elevated or spaced apart from the front wall of the first housing 20 so as to allow the resilient tab 34 to flex downwardly.

Thus, during installation the user simply places the base of the bolt 104 into the bolt housing 22 sliding the threaded shaft into the U-shaped slot 30 and the base 104*a* into the front opening 32. The front surface 40 is angled so as to help flex the resilient tab 34, placing the resilient tab 34 underneath the bottom surface of the base 104*a* of the bolt 104. The resilient tab 34 is pressed downwardly until the base 104*a* has passed the catch 38. When the base 104*a* passes the catch 38, the resilient tab 34 returns to its normal position as shown in FIG. 6 and presses the bottom surface of the base 104*a* upwardly so as to urge a top surface of the base 104*a* against an under surface of the upper wall 24.

Accordingly, the switch box 200 is configured to retain the bolt 104 in a fixed position, wherein the threaded shaft 104*b* does not tilt when the switch box 200 is mounted in a manner that places the threaded shaft 104*b* in a horizontal plane.

While particular embodiments have been illustrated and described herein, it should be understood that various other changes and modifications may be made without departing from the spirit and scope of the claims subject matter. Moreover, although various aspects of the claims subject matter have been described herein, such aspects need not be utilized in combination. It is therefore intended that the appended claims cover all such changes and modifications that are within the scope of the claims subject matter.

What is claimed is:

1. A housing for accommodating an electrical device, and a bolt for holding a bus bar electrically connected to the electrical device, the bolt having a threaded shaft and a base, the housing comprising:

- a first housing configured to hold the electrical device; and
- a bolt housing, the bolt housing having an upper wall, a pair of side walls and a bottom wall, the upper wall having a U-shaped slot; and
- a resilient tab disposed on the bottom wall and beneath the U-shaped slot, a pair of slits are disposed on the bottom wall and on each side of the resilient tab, wherein the threaded shaft is dimensioned to be seated within the U-shaped slot, and wherein the resilient tab presses the base against an undersurface of the upper wall so as to hold the bolt in an upright position relative to the upper wall.

2. The housing as set forth in claim 1, wherein the resilient tab includes a catch disposed on a distal end of the resilient tab.

3. The housing as set forth in claim 2, wherein the catch includes a front surface, the front surface angled with respect to a planar surface of the resilient tab.

4. The housing as set forth in claim 3, wherein the catch includes a catch surface, the catch surface being a planar surface orthogonal to a body of the resilient tab.

5. The housing as set forth in claim 4, wherein the catch further includes a pair of side surfaces, each of the pair of side surfaces are angle, the pair of side surfaces and the front surface defining a tapered body.

6. The housing as set forth in claim 4, wherein the catch further includes a pair of side surfaces, the side surfaces being planar with a respective one of a pair of outer side walls of the resilient tab.

7. A switch box for accommodating an electrical switch, and a bolt for holding a bus bar electrically connected to the electrical switch, the bolt having a threaded shaft and a base, the switch box comprising:

a first housing configured to hold the electrical switch, the first housing having a pair of side walls, a front wall and a back wall; and a bolt housing, the bolt housing disposed on the front wall of the first housing, the bolt housing having an upper wall, a pair of side walls and a bottom wall, the upper wall having a U-shaped slot, the bottom wall disposed on the front wall of the first housing; and a resilient tab disposed on the bottom wall and beneath the U-shaped slot and above the front wall of the first housing, a pair of slits are disposed on the bottom wall and on each side of the resilient tab, wherein the threaded shaft is dimensioned to be seated within the U-shaped slot, and wherein the resilient tab presses the base against an undersurface of the upper wall so as to hold the bolt in an upright position relative to the upper wall.

8. The switch box as set forth in claim 7, wherein the resilient tab includes a catch disposed on a distal end of the resilient tab.

9. The switch box as set forth in claim 8, wherein the catch includes a front surface, the front surface angled with respect to a planar surface of the resilient tab.

10. The switch box as set forth in claim 9, wherein the catch includes a catch surface, the catch surface being a planar surface orthogonal to a body of the resilient tab.

11. The switch box as set forth in claim 10, wherein the catch further includes a pair of side surfaces, each of the pair of side surfaces are angle, the pair of side surfaces and the front surface defining a tapered body.

12. The switch box as set forth in claim 10, wherein the catch further includes a pair of side surfaces, the side surfaces being planar with a respective one of a pair of outer side walls of the resilient tab.

* * * * *